May 21, 1957 H. C. HOFFMAN 2,792,625
RING ASSEMBLY MACHINE
Filed March 21, 1956 5 Sheets-Sheet 2

INVENTOR
Henry C. Hoffman
BY
L. D. Burch
ATTORNEY

May 21, 1957  H. C. HOFFMAN  2,792,625
RING ASSEMBLY MACHINE
Filed March 21, 1956  5 Sheets-Sheet 3

INVENTOR
Henry C. Hoffman
BY L. D. Burch
ATTORNEY

May 21, 1957  H. C. HOFFMAN  2,792,625
RING ASSEMBLY MACHINE
Filed March 21, 1956  5 Sheets-Sheet 5

INVENTOR
Henry C. Hoffman
BY L. D. Burek
ATTORNEY

United States Patent Office 2,792,625
Patented May 21, 1957

2,792,625

RING ASSEMBLY MACHINE

Henry C. Hoffman, Lansing, Mich., assignor to General Motors Corporation, Detroit, Mich., a corporation of Delaware Application March 21, 1956, Serial No. 572,991

6 Claims. (Cl. 29—453)

This invention relates to means for assembling rings about a cylindrical member and has particular application to an automatic piston ring assembly machine.

The assembly of piston rings on a piston member has heretofore been done manually by using a special tool to expand the ring, after which it is placed about a piston adjacent a ring receiving groove and released to seat itself within such groove. Inasmuch as several different type piston rings are required on each piston, considerable man-hours are necessary to complete each ring assembly operation.

Many different type fixtures have been used in an attempt to assemble rings on a piston by semiautomatic means. However, such machines have not proven entirely satisfactory in operation, dependability or savings in man-hours.

It is here proposed to provide a fully automatic ring assembly machine which, as used to assemble piston rings on a piston member, is a one station operation having different rings separately fed into position, spread to receive a cylindrical member disposed adjacent the respective ring receiving grooves provided therein, and simultaneously released to engage and seat in such grooves. The proposed machine is adapted to ready each successive group of rings during the removal and replacement of one piston member with another.

Figure 1:
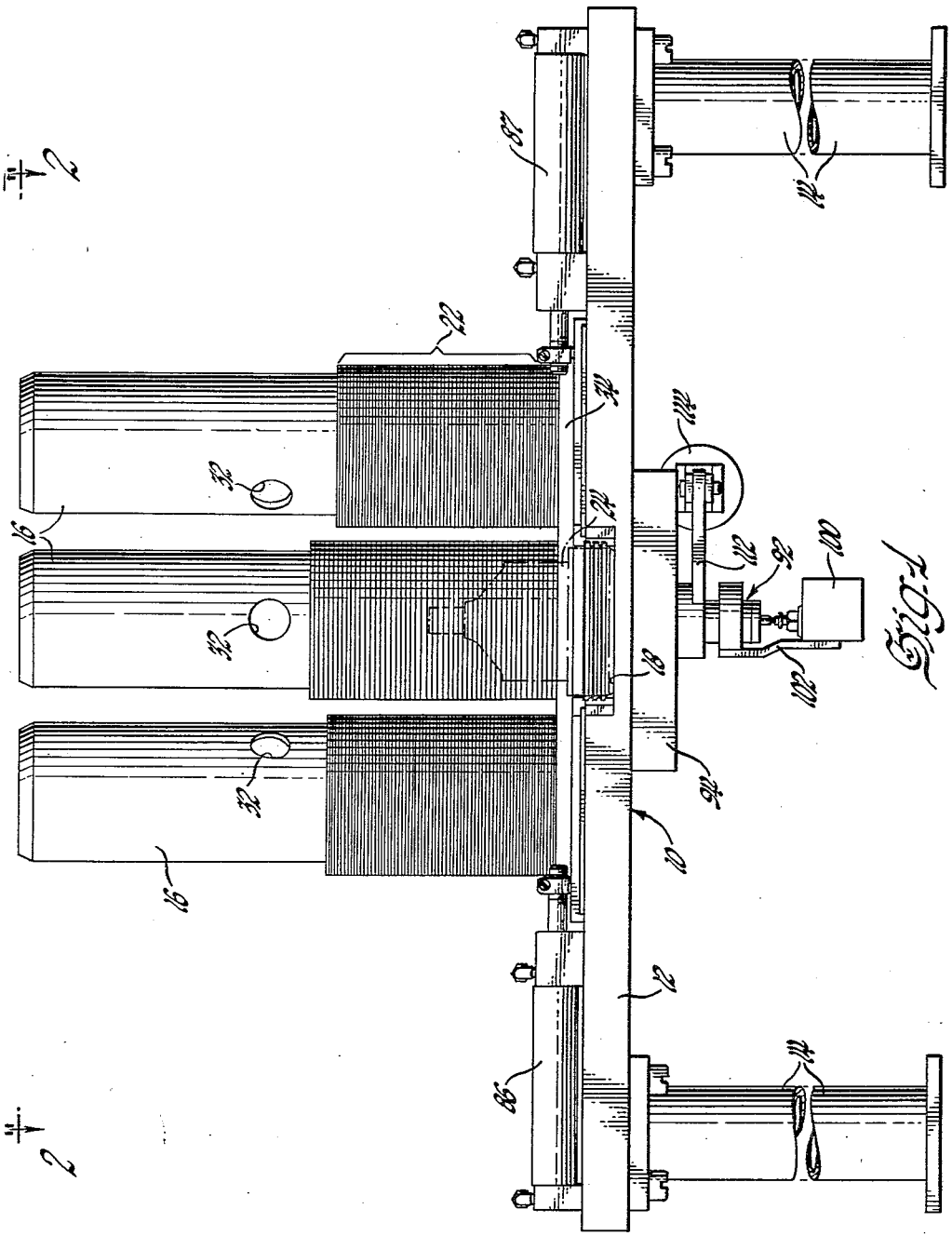
Figure 1 is a side elevational view of a piston ring assembly machine embodying the principles of this invention.

The drawing discloses a piston ring assembly machine 10 having a base plate or platform 12 mounted on legs 14 and disposed at table height to provide a working surface upon which is mounted piston ring retaining arbors 16 and within which is formed a piston receiving recess 18. The arbors 16 are arranged in an arc about the recess 18 and ring feeding or carrier means 20 extend radially outward therefrom. The ring carriers 20 are each adapted to receive a piston ring 22 from their respective arbors and to transfer the rings to recess 18 where they are spread open within the recess and readied to be received about a piston member, such as 24, positioned within the recess.

Figure 5:
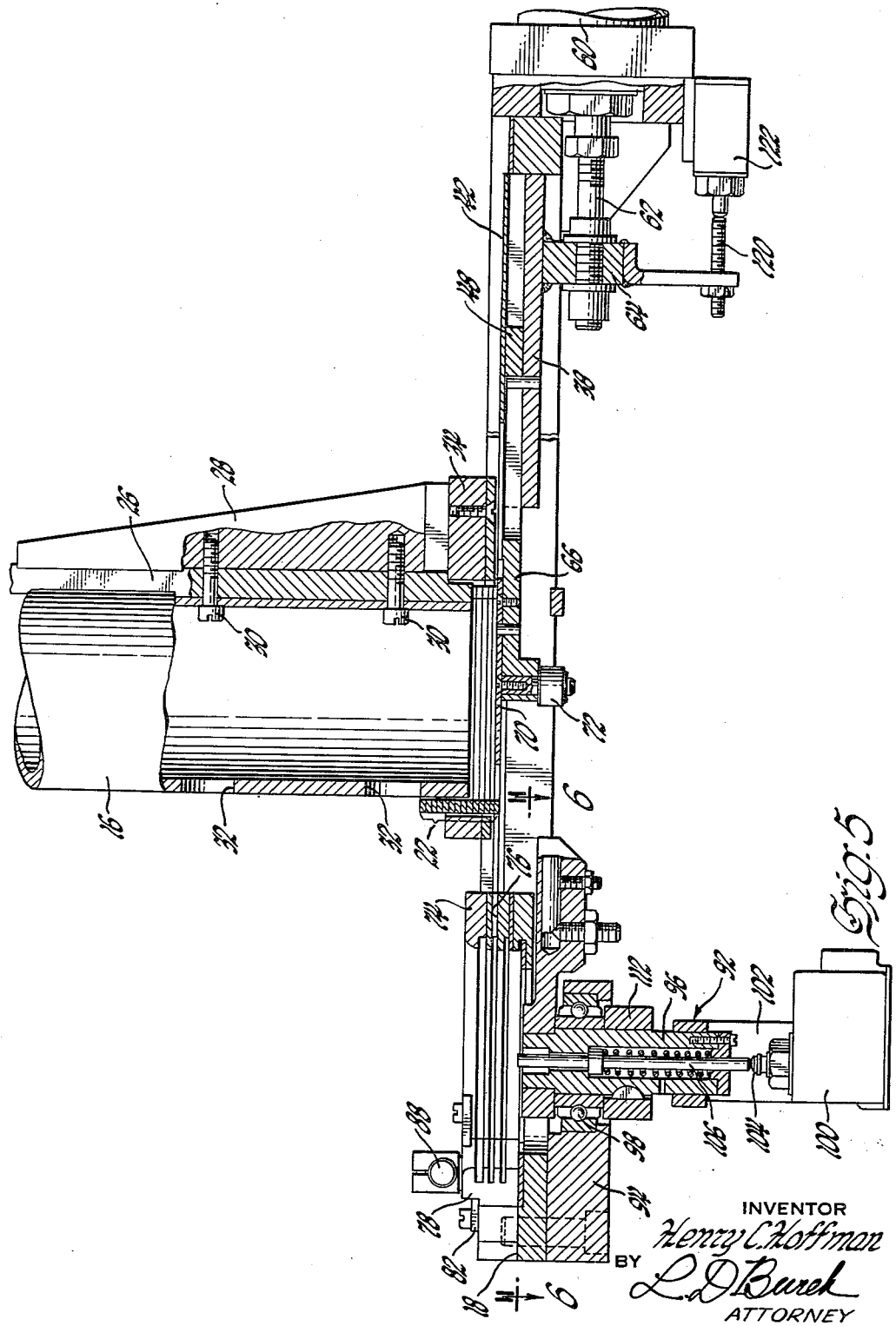
Figure 5 is an enlarged cross-sectional side view of the disclosed embodiment of the present invention as taken substantially in the plane of line 5—5 of Figure 2, looking in the direction of the arrows thereon.
Figure 6:
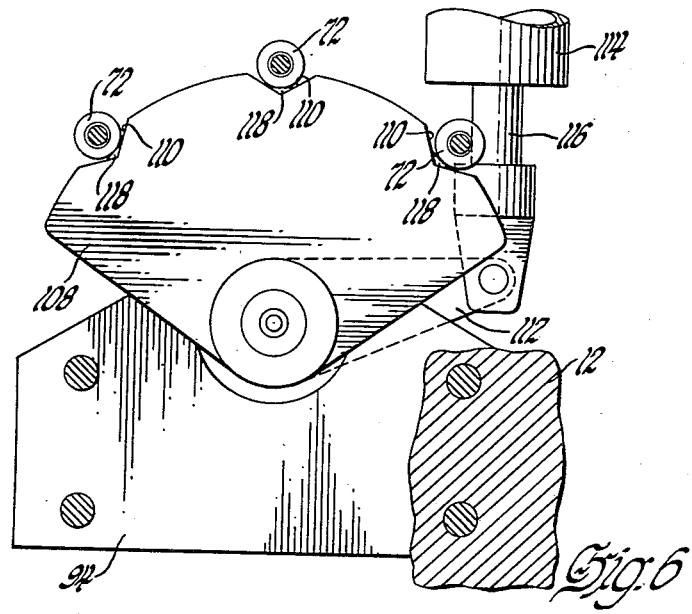
Figure 6 is a cross-sectional view of the ring expander actuator means as shown in the plane of line 6—6 of Figure 5, looking in the direction of the arrows thereon.

Each arbor 16 includes a ring gap guiding rib 26 and is secured to an upright support 28 through the rib as by fastening means 30. Accesses 32 are formed through the tubular arbors to reach the fastening means, as shown by Figure 5. The arbors 16 are disposed in spaced relation over the base plate 12 with the supports 28 secured to an arcuate plate 34 mounted on the base plate and having ring receiving accesses 36 formed therein directly under each arbor.

Figure 7:
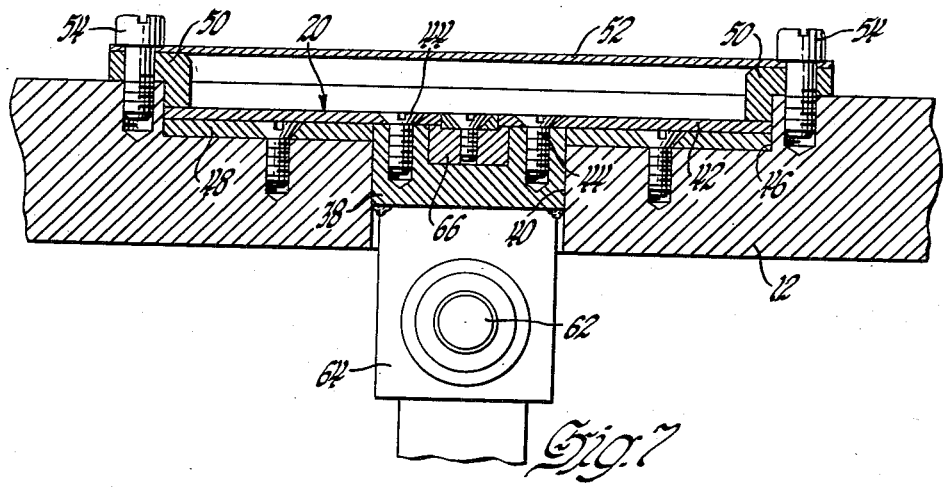
Figure 7 is an enlarged cross-sectional view of part of the ring feed means as seen in the plane of line 7—7 of Figure 2, looking in the direction of the arrows thereon.

Each ring feed or carrier means 20, as shown in part by Figure 7, includes a guide block 38 received within a guideway 40 formed through the base plate 12 and having a guide plate 42 secured thereto, as by fastening means 44, and guided within a guide slot 46 formed within the upper face of the base plate 12. The relative height of different ring carrier means is varied by providing different thickness shim plates 48, as required to locate the carrier means relative to the piston ring groove it services, as will be later described. The guide plates 42 are retained within guide slots 46 against inadvertent removal by retainer means 50 secured with a cover plate 52 to the base plate 12, as by fastening means 54.

The guide plate 42 is formed at its outer end to include forked or spaced arms 56 having arcuate inner edges 58 for receiving a piston ring 22 therebetween. The carrier means 20, including the guide block and plate 38 and 42, is reciprocated within respective guideways by piston cylinder means 60 having actuator rods 62 secured to a depending lug 64 fastened to the guide block 38. As the guide plates 42 travel back and forth under their respective piston ring arbors 16, they are adapted to each receive a single ring and to move the ring forwardly towards the receiving recess 18.

Secured to the plates 42 and extending therebeyond directly beneath the guide ribs 26 of the arbors 16 and between the forked arms 56 of the plates is a relatively movable member 66 having means secured thereto and disposed within the piston ring 22, as received, for spreading the piston rings. Such means 68 includes a triangular piece 70 adapted to be disposed within the plane of the piston ring 22 as received by one of the guide plates 42. The member 66 also includes a roller 72 secured near the end thereof.

Figure 4:
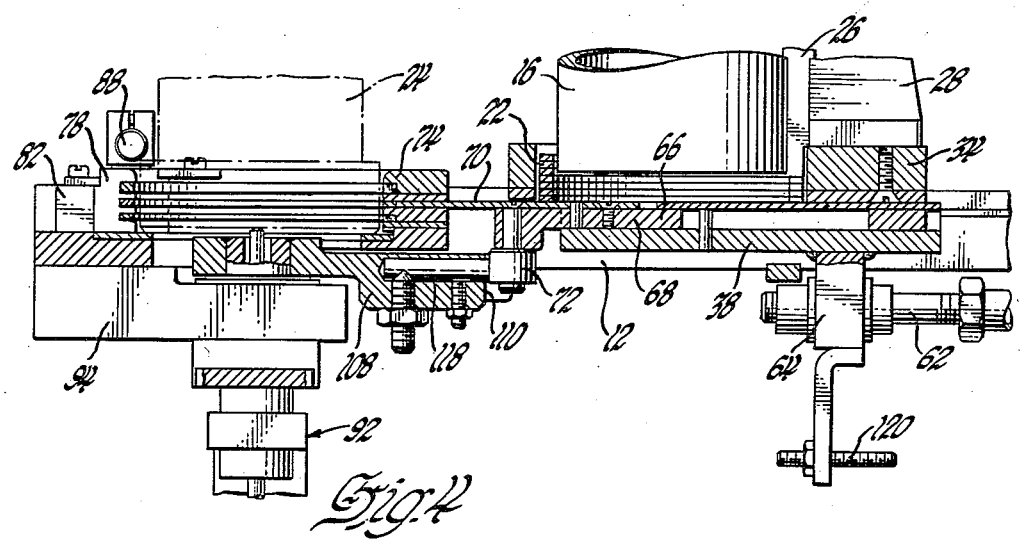
Figure 4 is a cross-sectional side view of the disclosed embodiment of the present invention as taken substantially in the plane of line 4—4 of Figure 3, looking in the direction of the arrows thereon.

As shown most clearly by Figures 4 and 5 the ring receiving recess 18 is formed partly by a member 74 circumferentially slotted, as at 76, in order to receive the piston rings 22 therethrough. Limiting the travel of the piston rings 22 through the member 74 are stop means 78 and 80 which are movable within guide tracks formed by the lead edge of member 74 and by guide rails 82 and 84, respectively. Travel of the stop means 78 and 80 is controlled by piston cylinder means 86 and 87 through actuator rods 88 and 89, respectively. The corners of the stop means adjacent the piston receiving recess 18 are formed to include slots, such as 90, for receiving, orienting, and retaining the piston rings 22 in their opened and spread state.

Secured to the table 12 directly beneath the piston receiving recess 18 is means 92 for signaling the receipt of a piston member and the release of the spread piston rings in order that they may be engaged within the ring receiving recesses of the piston member. Means 92 includes a support 94 secured to plate 12 and having a sleeve member 96 rotatable therein within bearing means 98. A limit switch 100 is secured to sleeve 96 and disposed therebelow as by support means 102. A spring loaded actuator rod 104 is mounted within the sleeve 96 and is aligned for engagement with switch means 104 of limit switch 100. Rod 106 is normally disposed to project above the seat of the piston recess 18.

Also secured to the sleeve 96 is a cam member 108 which is arcuate in shape and has circumferentially spaced peripheral recesses 110 disposed to receive the rollers 72 which are a part of the piston feed means 20. A lever arm 112 is keyed to sleeve 96, as shown in Figure 5, and as connected to piston cylinder means 114 through an actuator rod 116 secured to the end thereof. Seat inserts 118 are secured within the cam plate 108 and are exposed within the recesses 110 to minimize wear which might otherwise result from continued engagement of the rollers 72 within such recesses.

Figure 2:
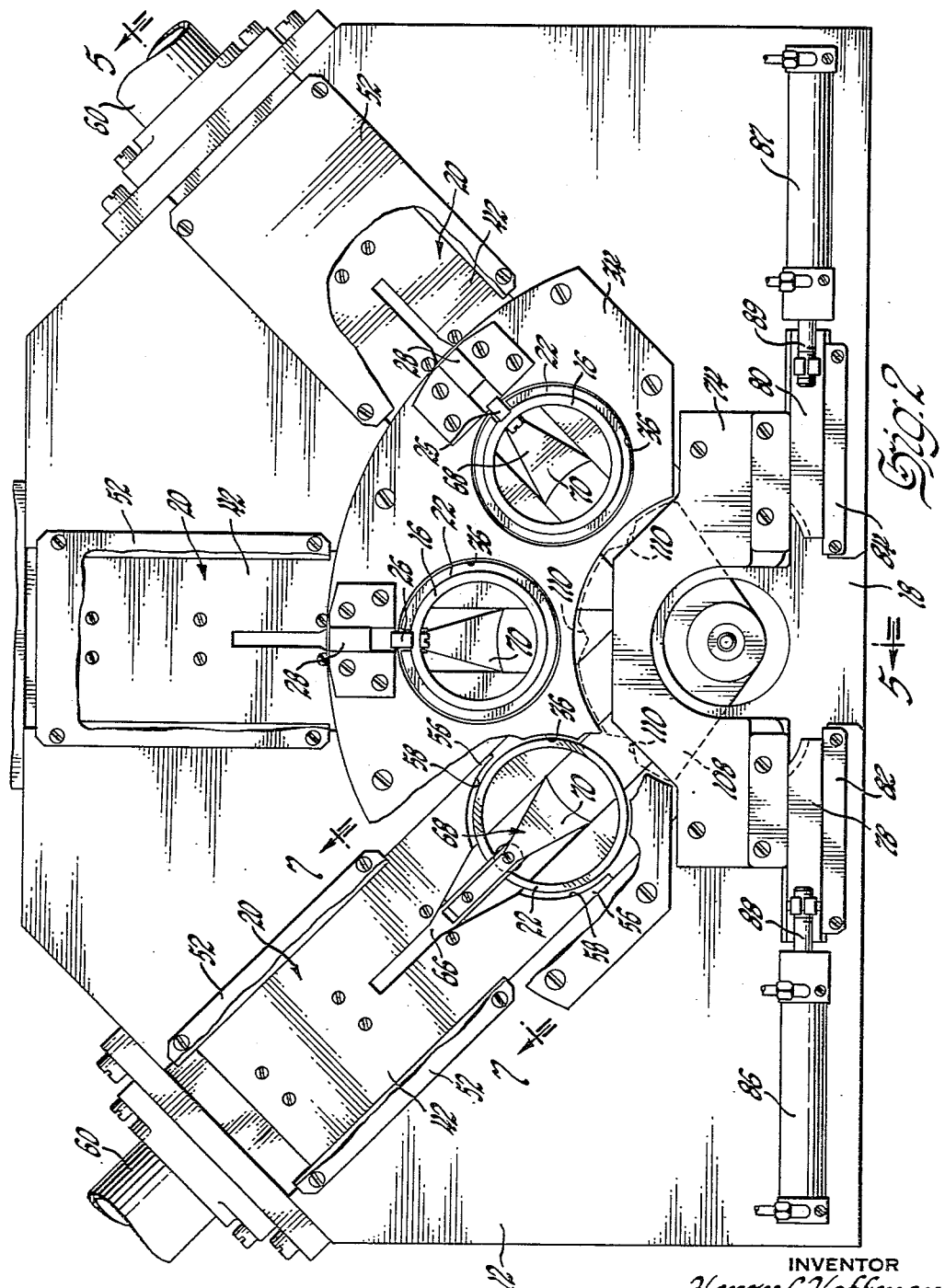
Figure 2 is a top view of the piston ring assembly machine of Figure 1 taken in the plane of line 2—2 and looking in the direction of the arrows thereon.
Figure 3:
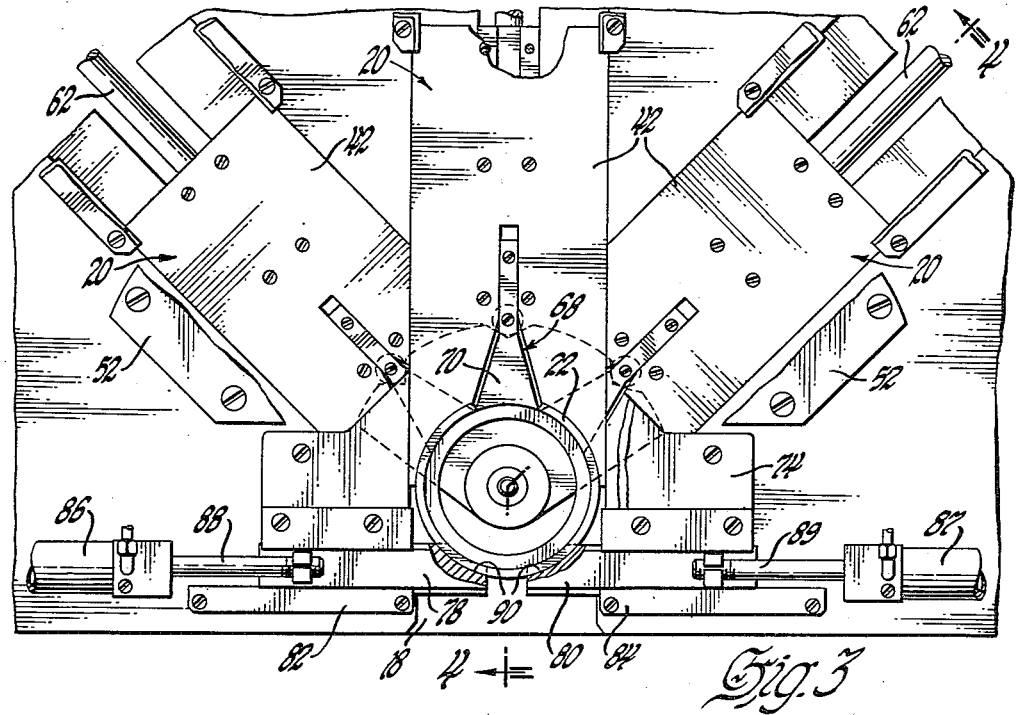
Figure 3 is a fragmentary top view of the piston ring assembly machine of Figure 1 showing the rings as positioned for assembly with a piston member.

Referring to Figures 2 and 3, it will be seen that as the feed means 20 move a piston ring 22 to within the piston receiving recess 18 that the roller 72 of spreader means 68, upon engagement with the cam recess 110, is stopped from further forward movement. Continued forward movement of the guide plate 42 moves the piston ring 22 forwardly relative to the triangular member 70 to spread the ring open. The piston ring 22 is then disposed within the piston receiving recess 18, as shown in Figure 3, with the ends of the ring engaging the ends of the triangular member 70. Rotation of the cam 108 by piston cylinder means 114 through lever arm 112 causes rollers 72 to ride out of recesses 110 and thereby back-off the triangular member 70 to release the piston rings 22 which then snap into the ring grooves of the piston member.

The receipt of a piston member within recess 18 depresses actuator rod 106 which activates limit switch 100 to signal rotation of cam 108 and the return of the feed means 20. An adjustable stop means 120 is secured to the lug 64 and is disposed to engage a limit switch 122 on the return stroke of the feed means.

The disclosed machine is adapted to be fully automatic as regards the feeding of piston rings. With the arbors 116 loaded with piston rings 22, the feed means 20, disposed in the position shown in Figures 1 and 2, will each receive a ring between the forked arms 56. Upon activation of the ring assembly machine, stops 78 and 80 are moved into position about recess 18, by cylinder means 86 and 87. Feed means 20 are moved towards the recess by cylinder means 60 until their rollers 72 engage within the recesses 110 of cam 108, after which continued forward movement of the feed means spreads the rings about the triangular member 70 to dispose the rings in different parallel planes and spread open about recess 18. When a piston member 24 is disposed within recess 18 and engages rod 106, limit switch 100 is energized to signal cylinder means 114 to rotate cam 108 and cause rollers 72 to be displaced from the recesses 110. This backs off the spreader means 68 and releases the rings which are then free to snap closed within the adjacently disposed ring gaps of the piston member. Immediately following the release of the piston rings feed means 20 is retracted (signaled through time delay relays or other means not here shown) to a position having stop 120 engaging switch 122 to signal a repeat of the ring feeding and spreading operation preparatory to the receipt of another piston member.

I claim:

1. Ring assembly means comprising means for retaining a plurality of rings, ring receiving means disposed apart from said retaining means, ring feeding means reciprocal between said retaining and receiving means, ring spreading means secured to said feeding means and relatively movable with respect thereto, cooperative means provided upon said receiving means and said spreading means for relatively moving said spreading means with respect to said feeding means during the advancement of said feeding means with a ring member towards said receiving means, said spreading means spreading open said ring member about the inner periphery of said receiving means and releasing said ring member therewithin.

2. Ring assembly means substantially as described by claim 1 which includes in combination therewith means operatively interconnecting said receiving means said spreading means and said feeding means for automatically withdrawing said feeding means and releasing a ring member from said spreading means only upon the receipt of a ring receiving member within said ring receiving means.

3. Ring assembly means substantially as described by claim 1 which includes a plurality of ring retaining means disposed arcuately about said receiving means and having said feeding means disposed in different parallel planes for transferring rings from each of said retaining means for receipt by a common member received within said receiving means.

4. Ring assembly means substantially as described by claim 1 which includes having said retaining means include an arbor having a ring gap receiving keyway and said ring feeding means comprising a plate reciprocal beneath said arbor and including forked arms receiving a ring member therebetween, said spreading means comprising a triangular member secured to and relatively movable with respect to said feed means in the plane of and between said forked arms.

5. Piston ring assembly means comprising a base member having a piston ring receiving recess provided therein, a plurality of ring receiving arbors mounted upon said base member and disposed arcuately about said recess, said arbors each including a keyway received within the ring gaps of said piston rings on said arbors for aligning said rings, reciprocal ring feeding means mounted upon said base member for travel between said arbors and said recess, said feeding means of each of said arbors being disposed in different parallel planes for delivering in combination a plurality of axially aligned rings within said recess, each of said feeding means including forked arms for receiving a piston ring therebetween, relatively movable ring spreading means secured to said feeding means between said forked arms and including a wedge member extended through the gap of a ring disposed within said forked arms, operative means provided upon said spreading means for limiting forward travel thereof without interfering with the forward travel of said ring feeding means relative to said recess, said feeding means moving said rings relative to said wedge members for spreading said rings within the inner periphery of said recess, and means operatively disposed within said recess and engaged by a piston member when received therein and operatively connected to said spreading and feeding means for withdrawing first said spreading means for releasing said ring members and subsequently withdrawing said feeding means.

6. A method of automatically assembling piston rings upon a piston member which includes, retaining a plurality of different piston rings in respective axially aligned and adjacently disposed positions, simultaneously feeding one of each of said rings towards a common objective in different parallel planes, spreading said rings open during the feeding thereof, holding said rings open in axially aligned parallel relation to one another at said common objective, and releasing said rings upon the receipt of a piston member therewithin.

References Cited in the file of this patent
UNITED STATES PATENTS

| 1,525,765 | Brenner | Feb. 10, 1925 |
| 1,537,773 | Johnson | May 12, 1925 |
| 1,852,613 | Jessen | Apr. 5, 1932 |